2,729,629
Patented Jan. 3, 1956

2,729,629

GREEN SUBSTANTIVE DYESTUFF MIXTURES AND PROCESS OF MAKING SAME

Wolfgang Frey, Neue Welt, near Basel, and Albin Peter, Binningen, Switzerland, assignors to Sandoz A. G., Basel, Switzerland, a Swiss firm No Drawing. Application April 21, 1952,
Serial No. 283,495

Claims priority, application Switzerland April 25, 1951

12 Claims. (Cl. 260—144)

The present invention relates to new green substantive dyestuffs of the anthraquinone series.

The new dyestuffs of the invention are obtained when one mol of an anthraquinone derivative of the composition

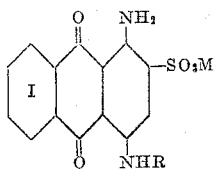

wherein M represents H, Li, Na or K, and R stands for a phenyl or diphenyl radical which contains a free amino group and may be substituted by alkyl, alkoxy or $SO_3H$, and wherein nucleus I may carry a sulfonic acid group or one or two halogen atoms, is condensed with one mol of a yellow aminoazo dyestuff which may contain solubilizing groups and/or metal complex forming groups or with one mol of a metal complex of the said aminoazo dyestuff, by the action of one mol of a dicarboxylic acid halide of the formula

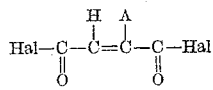

wherein Hal stands for chlorine or bromine, and A stands for hydrogen, chlorine, bromine or methyl, and if desired the resultant dyestuff treated in substance or on the fiber with a metal-yielding agent.

Suitable initial anthraquinone derivatives comprise the condensation products of 1-amino-4-halogeno-anthraquinone-2-sulfonic acid, 1-amino-4-halogeno-anthraquinone-2,5-disulfonic acid, 1-amino-4-halogeno-anthraquinone-2,6-disulfonic acid, 1-amino-4-halogeno-anthraquinone-2,7-disulfonic acid, 1-amino-4-halogeno-anthraquinone-2,8-disulfonic acid, 1-amino-4-halogeno-6-chloro-anthraquinone-2-sulfonic acid, 1-amino-4-halogeno-7-chloro-anthraquinone-2-sulfonic acid or 1-amino-4-halogeno-6,7-dichloroanthraquinone-2-sulfonic acid with 1,4-diaminobenzene, 2-methyl-1,4-diaminobenzene, 2-methoxy-1,4-diaminobenzene, 1,4-diaminobenzene-2-sulfonic acid, 4,4'-diamino-1,1'-diphenyl, 4,4'-diamino-1,1'-diphenyl-3-sulfonic acid, 3,3'-dimethyl-4,4'-diamino-1,1'-diphenyl, 3,3'-dimethoxy-4,4'-diamino-1,1'-diphenyl or 4,4'-diamino-1,1'-diphenyl-3,3'-disulfonic acid.

Suitable starting aminoazo compounds comprise for example 4-aminoazobenzene-4'-sulfonic acid, 4-aminoazobenzene-4'-carboxylic acid, 4-amino-4'-hydroxyazobenzene-3'-carboxylic acid, as well as yellow aminoazo dyestuffs of more complex structure such as disazo dyestuffs, naphthalene derivatives, stilbene derivatives, pyrazolone derivatives, derivatives of acetoacetic acid-N-arylamides, etc.

The dicarboxylic acid halides used for forming the bridge between the starting compounds comprise for example the dichlorides and dibromides of fumaric and maleic acid, of methyl-fumaric acid, of methyl-maleic acid, of chlorofumaric acid and of bromofumaric acid, etc.

In order to compensate for possible losses due to hydrolysis, it is desirable to use the dicarboxylic acid halide in slight excess.

In carrying out the process, the mixture of anthraquinone derivative and aminoazo compound is dissolved in water, and then the dicarboxylic acid halide is added at a low temperature, about —10° C. to about +30° C. The mixture is stirred vigorously, care being taken, by the addition of an acid-binding agent, such for example as sodium bicarbonate, sodium carbonate, sodium hydroxide or the corresponding lithium or potassium compounds, to maintain the reaction substantially neutral throughout. The dicarboxylic acid halide may, if desired, be diluted with a solvent which is inert to the dihalide, such for example as carbon tetrachloride, chloroform or benzene.

The condensation is completed when no further alkali is needed in order to keep the reaction neutral.

The resultant dyestuffs are recovered by salting out from neutral or alkaline reaction medium or by acidification. The precipitate is filtered from the mother liquor and dried, advantageously after having neutralized the precipitate, which is thrown down as the free acid, by trituration with lithium carbonate or sodium carbonate.

The new dyestuffs are generally mixtures of symmetrical and asymmetrical dicarboxylic acid derivatives, which for dyeing purposes behave as a unitary dyestuff. They all contain as an essential component a compound of the composition

X—Y—Z wherein X represents the desired anthraquinone derivative moiety, Z represents the aminoazo compound moiety, and Y represents the radical of the dicarboxylic acid of the dicarboxylic acid halide. They dissolve in water with green coloration and draw very uniformly from the conventional sodium carbonate-sodium sulfate bath onto cotton and fibers of regenerated cellulose, yielding green to yellow-green dyeings. The dyeings are of good fastness to light and to washing.

In so far as the dyestuffs comprise complex-forming groups free from metal atoms, they can be metallized in accordance with conventional metallizing procedure. Likewise their dyeings may be aftertreated in conventional manner with metal-yielding agents. The metal-containing dyeings possess in many cases better fastness to washing and/or better fastness to light than the correponding metal-free dyeings. Suitable metals are for example nickel, cobalt, chromium, iron, manganese and aluminum, but primarily copper.

The following examples set forth representative exemplary embodiments of the invention, and these examples are intended to be solely illustrative and not at all limitative. Except as otherwise indicated, the parts are parts by weight, the percentages are percentages by weight, and the temperatures are expressed in degrees centigrade. Parts by volume bear the same relationship to parts by weight as do cubic centimeters to grams.

*Example 1*

5.65 parts of the condensation product of 1-amino-4-bromoanthraquinone-2-sulfonic acid with 4,4'-diamino-1,1'-diphenyl-3-sulfonic acid, and 2.8 parts of 4-aminoazobenzene-4'-sulfonic acid are dissolved in 400 parts of water with the aid of 4.8 parts of aqueous sodium hydroxide solution of 29% strength. 1.6 parts of fumaric acid dichloride are added dropwise to the solution at 0–3°, the pH of the mixture being maintained at 4.5–5 by the simultaneous addition of approximately 9 parts of aqueous sodium hydroxide solution of 10% strength. As soon as no more sodium hydroxide is consumed, the mixture is adjusted to a pH of 7.5 by the addition of approximately 2 parts of aqueous sodium hydroxide solution of 10% strength, the mixture heated to 70°, and the dyestuff salted out with 12 parts of sodium chloride. The precipitated dyestuff is isolated by suction filtration and is dried.

The dyestuff is a green powder which dissolves in water with green coloration and which dyes cotton and fibers of regenerated cellulose in beautiful green shades of good fastness to light and to washing.

The dyestuff consists of three components, namely, a blue-green component and a green component which is the essential one and a yellow component. The mixture, for dyeing purposes, acts as a unitary dyestuff. The green component is the asymmetric compound of the formula

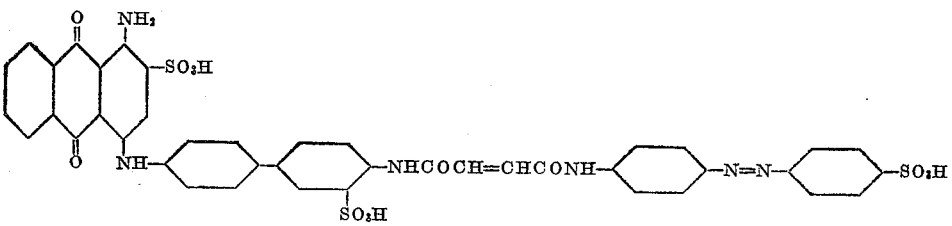

The blue-green component is the symmetrical component of the formula

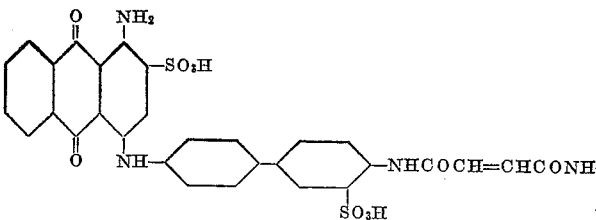

and the yellow component is the resultant of the union of two 4-aminoazobenzene-4'-sulfonic acid molecules, and corresponds to the formula

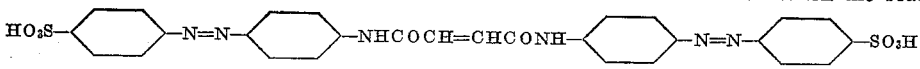

Example 2

5.8 parts of the lithium salt of the condensation product of 1-amino-4-bromoanthraquinone-2,6-disulfonic acid with 4,4'-diamino-1,1'-diphenyl, and 2.85 parts of the lithium salt of 2-aminoazobenzene-4'-sulfonic acid are dissolved in approximately 500 parts of water. To the resultant solution, there is added dropwise at 0–4° a solution of 1.6 parts of fumaric acid dichloride in 20 parts of carbon tetrachloride, and the pH of the mixture is maintained constantly between 5.8 and 6.2 by the simultaneous addition of approximately 9 parts by weight of aqueous sodium hydroxide solution of 10% strength. Upon completion of the reaction, the pH of the mixture is adjusted to 7.5 by means of approximately 2 parts of aqueous sodium hydroxide solution of 10% strength, the carbon tetrachloride is distilled off, the dyestuff is salted out at 70° with 15 parts of sodium chloride, and the precipitated dyestuff is filtered off at 40° and then dried.

There is obtained a green powder which dissolves in water with yellowish green coloration and which dyes cotton and fibers of regenerated cellulose from a sodium carbonate-sodium sulfate bath in beautiful yellow-green shades which are characterized by good fastness properties.

As in Example 1, the thus-obtained dyestuff is a mixture of 3 components which, for dyeing purposes, behave as a unitary dyestuff.

Example 3

6.1 parts of the anthraquinone derivative of the composition

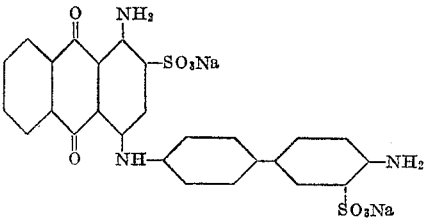

and 5.2 parts of the azo dyestuff of the composition

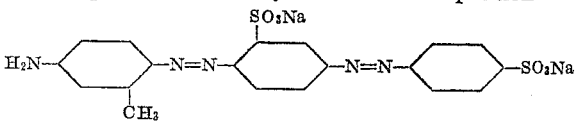

are dissolved in 600 parts of water, and the solution cooled to 0–3°. Thereupon, in the course of a half hour and while stirring thoroughly, 1.2 parts by volume of

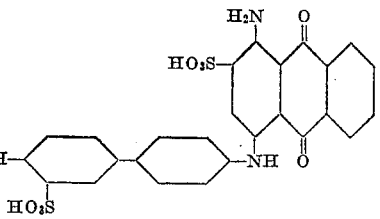

fumaric acid dichloride are added dropwise, the pH being maintained throughout at 7 by the addition of sodium bicarbonate. When the reaction is completed, 54 parts of sodium chloride and then 200 parts of ethyl alcohol are added, and the mixture subjected to suction filtration. The thus-isolated dyestuff is, after being dried, a dark green powder; it is very easily soluble in water and dyes cotton and fibers of regenerated cellulose in yellowish green shades of good fastness to light and washing.

A similar dyestuff is obtained when, while otherwise proceeding as described in the preceding paragraph, the acylation is carried out with 1.3 parts by volume of methylfumaric acid dichloride instead of 1.2 parts by volume of fumaric acid dichloride.

By employing 1.3 parts by volume of chlorofumaric acid dichloride or 1.4 parts by volume of bromofumaric acid dichloride as the acylating agent, there is obtained a somewhat bluer dyestuff with similar fastness properties. In each case, the dichloride may be replaced by an equivalent quantity of the corresponding dibromide.

Example 4

5.7 parts of the anthraquinone derivative of the formula

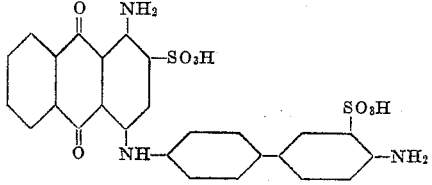

and 4.75 parts of the azo dyestuff of the formula

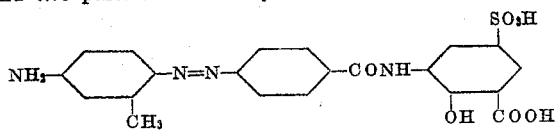

are dissolved together with 0.9 part of lithium carbonate in 600 parts of water. After cooling the solution to 0–3°, a total of 11 parts by volume of a molar solution of maleic acid dichloride in carbon tetrachloride are added portionwise, the pH of the reaction mixture being maintained at 6.8–8 by the dropwise addition of the necessary quantity of an aqueous sodium hydroxide solution of 10% strength. Upon conclusion of the condensation, the carbon tetrachloride is distilled off and the dyestuff is salted out in the cold. After filtering off the dyestuff with the aid of suction and then drying the same, there is obtained a dark green powder which dyes cotton and fibers of regenerated cellulose from an aqueous bath in green shades of good fastness to light and to washing.

Upon aftertreatment of the dyeings with a salt of copper, chromium, nickel, cobalt, iron or manganese, the shade is not essentially altered; however, the fastness properties, and particularly fastness to water and in the case of copper also fastness to light are improved.

The maleic acid dichloride is prepared by heating maleic anhydride with phosphorus pentachloride, followed by removal by distillation of the formed phosphorus oxychloride and rectification of the obtained fumaric and maleic acid dichlorides.

*Example 5*

0.8 part of lithium carbonate is introduced into 600 parts of water, and then 4.1 parts of the anthraquinone derivative of the formula

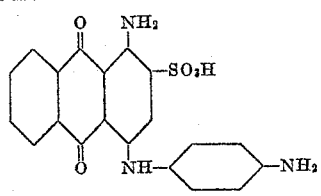

and 4.7 parts of the azo dyestuff of the formula

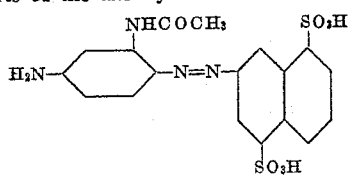

are added.

When dissolution is complete, the solution is cooled to 0–5° and then while stirring thoroughly 3 additions, each of 0.4 part by volume, of fumaric acid dichloride are made at intervals of 15 minutes, the pH being maintained at 6.8–8.5 by the dropwise addition of an aqueous sodium hydroxide solution of 10% strength. Upon completion of the condensation, the pH is adjusted to 8, 42 parts of sodium chloride are added, and the precipitated dyestuff is filtered off with suction. After having been dried, the dyestuff is obtained in the form of a dark powder which dyes cotton and fibers of regenerated cellulose a deep green, from an aqueous bath. The dyeings obtained with the dyestuff possess very good fastness to washing and to light.

*Example 6*

With the aid of 0.5 part of lithium carbonate, 4.1 parts of the anthraquinone derivative of the formula

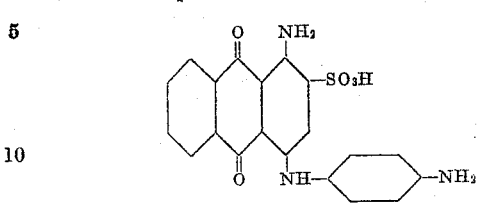

and 5.2 parts of the azo dyestuff of the formula

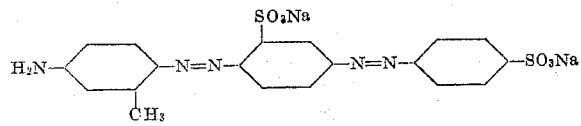

are dissolved in 600 parts of water. The solution is cooled to 10° and while stirring thoroughly, 11 parts by volume of a molar solution of fumaric acid dichloride in carbon tetrachloride are run in within a period of 45 minutes. The pH of the reaction mixture is maintained throughout at 6.5–8.5 by the simultaneous dropwise addition of a total of 8 parts by volume of aqueous sodium hydroxide solution of 10% strength. Upon completion of the acylation the reaction mixture is adjusted to a pH of 8, the carbon tetrachloride is distilled off, 18 parts of sodium chloride are added, the precipitated dyestuff is filtered off by suction filtration at 25° and the thus-isolated product is dried.

The resultant dark green powder dissolves in water with green coloration; the resultant solution yields green dyeings on cotton and fibers of regenerated cellulose. The dyeings are characterized by very good wet fastness properties and outstanding fastness to light.

*Example 7*

5.35 parts of the anthraquinone derivative of the formula

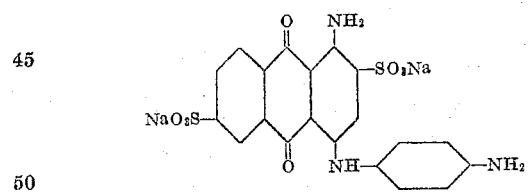

and 6.95 parts of the azo dyestuff composition of the formula

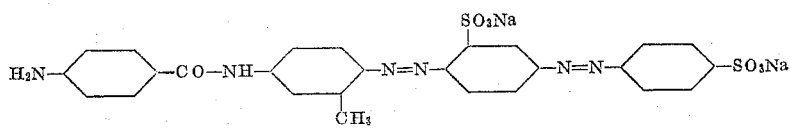

are dissolved in 400 parts of water. The solution is cooled to 0–4° and, in the course of 45 minutes and while stirring thoroughly, 11 parts by volume of a molar solution of fumaric acid dichloride in carbon tetrachloride are added dropwise from a dropping funnel. The liberated hydrochloric acid is neutralized by means of 8 parts by volume of aqueous sodium hydroxide solution of 10% strength in such manner that the pH of the reaction mixture remains at 7–8. Upon completion of the condensation, the carbon tetrachloride is removed by distillation, 36 parts of sodium chloride are added, the precipitated dyestuff is filtered off by suction filtration at 20° and is then dried.

The dyestuff dyes cotton and fibers of regenerated cellulose in an aqueous bath in yellow-green shades with good fastness to washing and to light.

Example 8

Into 600 parts of water there are stirred 0.5 part of lithium carbonate, 4.1 parts of the anthraquinone derivative of the formula

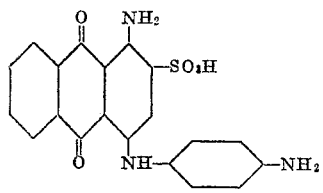

and 6.0 parts of the azo dyestuff of the formula

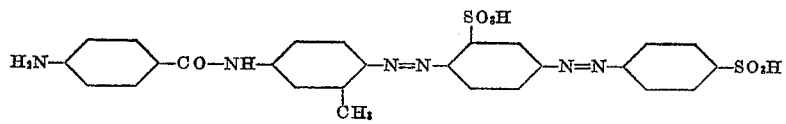

After cooling the resultant solution to 5°, 1.2 parts by volume of fumaric acid dichloride are added dropwise in the course of a half hour and while stirring thoroughly. The reaction mixture is maintained neutral by the dropwise addition of an aqueous sodium hydroxide solution of 10% strength. Upon completion of the reaction the reaction mixture is adjusted to a pH of 7.5, 36 parts of sodium chloride added and the dyestuff is filtered off and dried.

The thus-obtained dyestuff dyes cotton and fibers of regenerated cellulose from an aqueous bath in green shades of outstanding fastness to light and to washing.

Example 9

1.2 parts of lithium carbonate, 8.2 parts of the anthraquinone derivative of the formula

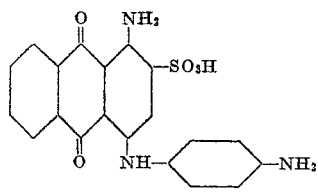

and 5.6 parts of the azo dyestuff of the formula

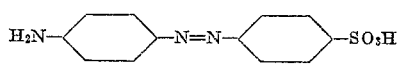

are stirred into 700 parts of water. Acylation is then carried out at 0–3° and while maintaining neutral to weakly alkaline reaction conditions by running in 21 parts by volume of a molar solution of fumaric acid dichloride in carbon tetrachloride and neutralizing the liberated hydrochloric acid by means of an aqueous sodium hydroxide solution of 10% strength.

Upon completion of the reaction, the reaction mixture is adjusted to a pH of 7.5, the carbon tetrachloride is distilled off, 70 parts of sodium chloride are added, and, after cooling, the precipitated dyestuff is filtered off by suction filtration and is dried.

The thus-obtained dark green powder dyes cotton and fibers of regenerated cellulose from an aqueous bath a pure green, and the resultant dyeings have good light- and wet-fastness properties.

Example 10

6.1 parts of the anthraquinone derivative of the formula

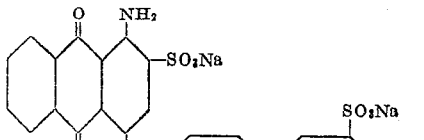

and 3.3 parts of the azo dyestuff of the formula

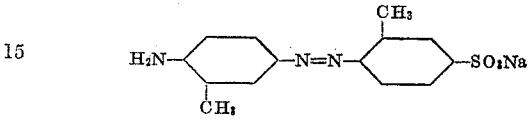

are dissolved in 600 parts of water, the temperature of the solution adjusted to 15°, and acylation carried out with 10.5 parts by volume of a molar solution of fumaric acid dichloride in carbon tetrachloride, while stirring thoroughly. The reaction mixture is kept at neutrality by the dropwise addition of a total of 8 parts by volume of an aqueous sodium hydroxide solution of 10% strength. Upon completion of the condensation and distilling off of the carbon tetrachloride, 40 parts of sodium chloride are added, the precipitated dyestuff is filtered off by suction filtration at 25°, and the thus-isolated dyestuff is then dried.

The dyestuff is a dark green powder; it is characterized by excellent fastness to boiling and dyes cotton and fibers of regenerated cellulose from an aqueous bath in bright green shades of good fastness to light and to washing.

Example 11

4.1 parts of the anthraquinone derivative of the formula

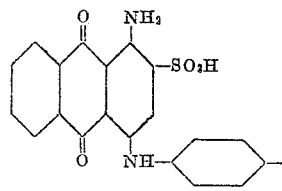

and 4.2 parts of the azo dyestuff of the formula

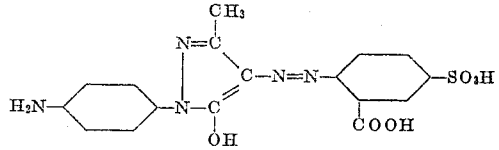

are dissolved in 600 parts of water, using 7 parts by volume of an aqueous sodium hydroxide solution of 10% strength. The solution is then cooled to 0–3° and, after adjusting to neutrality, 1.2 parts by volume of fumaric acid dichloride are run in. The liberated hydrochloric acid is neutralized with the aid of 9 parts by volume of aqueous sodium hydroxide solution of 10% strength. Upon completion of the reaction, 40 parts of sodium chloride are added, the dyestuff is filtered off cold, and is then dried.

The thus-obtained dyestuff is a mixture of the following three components:

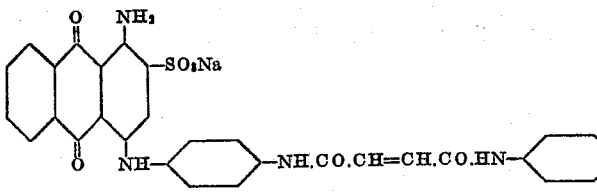

and

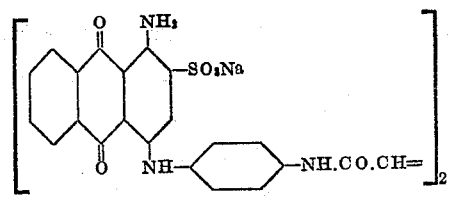

The dyestuff dyes cotton and fibers of regenerated cellulose a pure green; the dyeings are of very good light- and wash-fastness.

Upon aftertreatment of the dyed fibers with copper salts, a somewhat more yellow dyeing of extraordinary fastness to light is obtained.

A similar dyestuff with like properties is obtained when, while otherwise proceeding as set forth in the first paragraph of the present example, the 4.1 parts of the aforedescribed anthraquinone derivative are replaced by 5.7 parts of the anthraquinone derivative of the formula

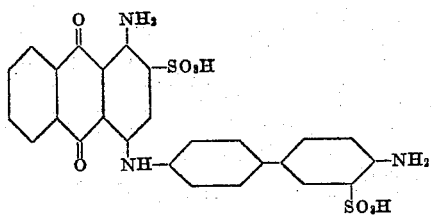

The dyestuffs can also be converted in substance into their complex copper compounds. For this purpose, 5 parts of the dyestuff are dissolved in 400 parts of water at 80°, 2 parts of crystallized sodium acetate are added, and then 4.6 parts by volume of a solution of 20% strength of copper sulfate in water are allowed to drop in slowly until an excess of copper salt can be detected with the aid of $K_4Fe(CN)_6$. 20 parts of sodium chloride are then added, and the precipitated cupriferous dyestuff is filtered off by suction filtration at 65° and is dried.

The copper complex compounds of the dyestuffs are also obtained by combining the anthraquinone derivatives of the present example with the complex copper compound of the formula

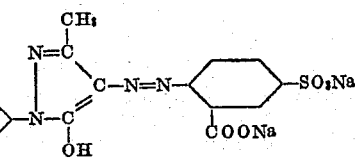

by reaction with fumaric acid dichloride. In the case of the employment of the first anthraquinone derivative of the present example, the product is a mixture consisting of the following components:

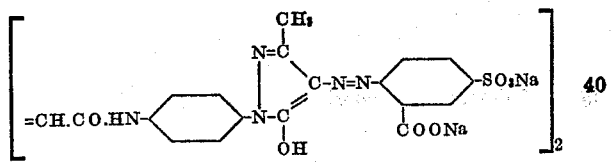

and

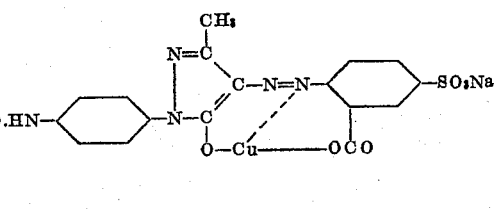

The coppered dyestuffs dye cotton and fibers of regenerated cellulose in yellowish green shades of good wet fastness properties and outstanding fastness to light.

Instead of using an aqueous sodium hydroxide solution of 10% strength and sodium chloride for salting out in this example, an equivalent quantity of an aqueous potassium hydroxide solution of 10% strength and potassium chloride may be used, in which case the Na atoms in the respective products will throughout be replaced by K atoms.

In each case, the mixture acts for dyeing purposes as a unitary dyestuff.

*Example 12*

1.2 parts of lithium carbonate, 5.7 parts of the anthraquinone derivative of the formula

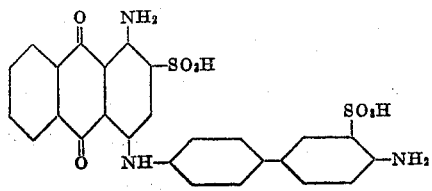

and 3.1 parts of the azo compound of the formula

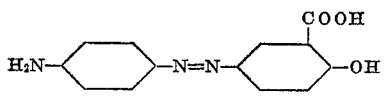

are dissolved in 600 parts of water.

Into the resultant solution, at 18° and a pH of 6.5 to 8.5 and while agitating thoroughly, 1.2 parts by volume of fumaric acid dichloride are run in slowly. The liberated hydrochloric acid is neutralized with 7 parts by volume of an aqueous sodium hydroxide solution of 10% strength. Upon completion of the reaction, 26 parts of sodium chloride are added, and the precipitated dyestuff is filtered off and dried.

The thus-obtained dyestuff is a mixture which consists of the following components:

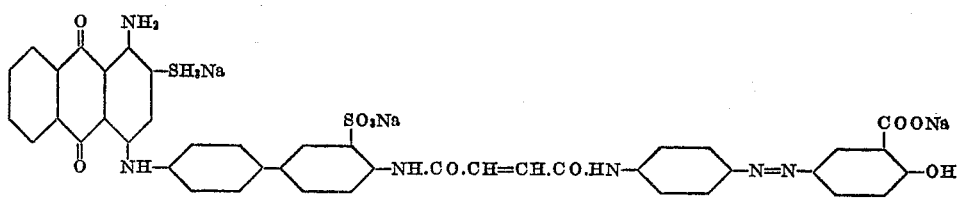

and

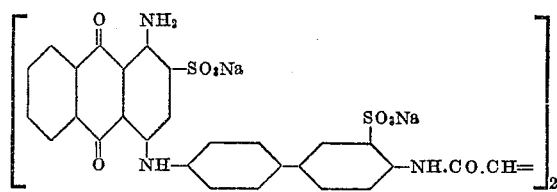

It dyes cotton and fibers of regenerated cellulose from an aqueous bath in yellowish green shades of good light- and wash-fastnesses.

Aftertreatment of the dyed material with a salt of copper or of nickel, cobalt, chromium, manganese or aluminum displaces the shade somewhat toward the yellow, and simultaneously enhances the fastness to washing.

If, while otherwise proceeding as described in the first two paragraphs of the present example, the 5.7 parts of the therein-described anthraquinone are replaced by 4.1 parts of the compound of the formula

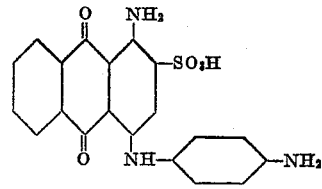

a similar dyestuff with similar properties is obtained.

*Example 13*

1 part of lithium carbonate, 4.1 parts of the anthraquinone derivative of the formula

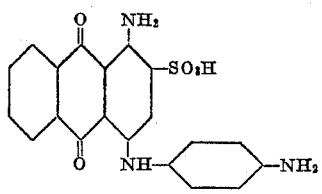

and 7.4 parts of the cupriferous azo dyestuff of the formula

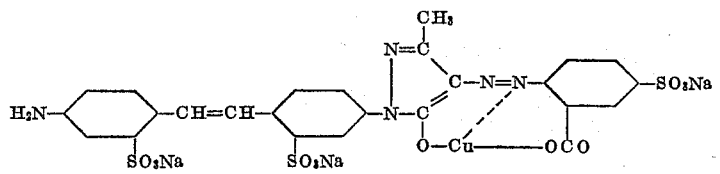

are added to 600 parts of water. When dissolution is complete, the solution is cooled to 0–5° and 11 parts by volume of a molar solution of fumaric acid dichloride in carbon tetrachloride are added slowly, while agitating thoroughly.

By the dropwise addition of 8 parts by volume of and aqueous sodium hydroxide solution of 10% strength, the pH of the reaction mixture is constantly maintained between 7.5 and 8.5. Upon completion of the acylation, the carbon tetrachloride is distilled off, 30 parts of sodium chloride are added, and then the precipitated dyestuff is filtered off cold by suction filtration and is dried.

The dyestuff is a mixture which consists of the following components and, for dyeing purposes, acts as a unitary dyestuff:

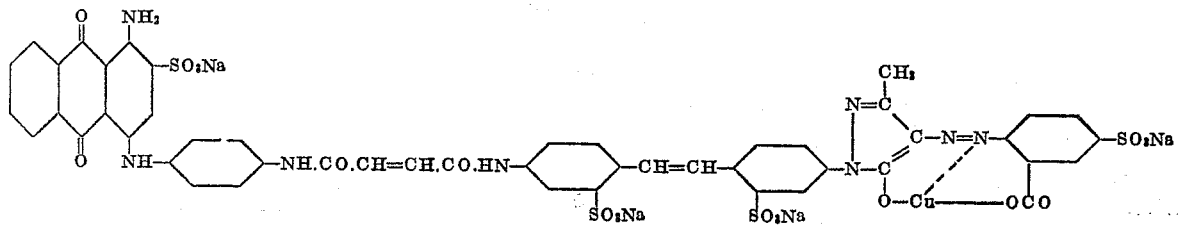

and

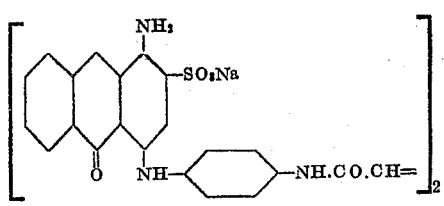

and

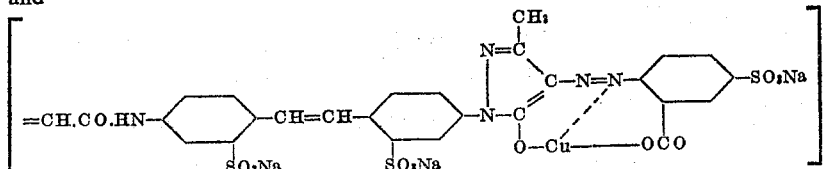

The resultant dyestuff, which in the dried form is a dark green powder, dyes cotton and fibers of regenerated cellulose from an aqueous bath in yellowish green shades characterized by good wet fastness properties and good fastness to light.

*Example 14*

1 part of lithium carbonate, 5.7 parts of the technical mixture of the anthraquinone derivatives of the formulae

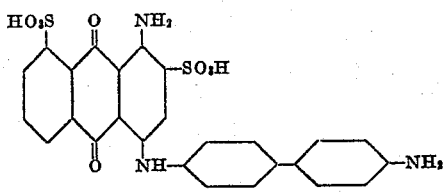

and

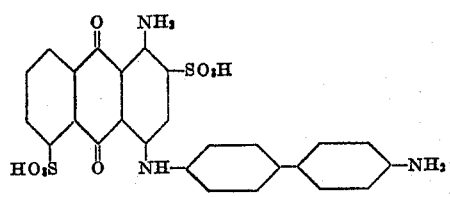

and 7.4 parts of the cupriferous azo dyestuff of the formula

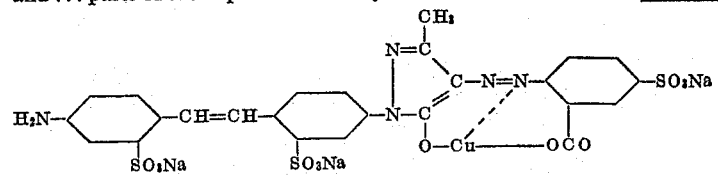

are dissolved in 600 parts of water. When dissolution is complete, the solution is cooled to 0.5° and acylation carried out by the slow dropwise addition thereto, while thoroughly agitating, of 11 parts by volume of a molar solution of fumaric acid dichloride in carbon tetrachloride, the pH being retained constantly between 7.5 and 8.5 by the simultaneous dropwise addition of 8 parts by volume of an aqueous sodium hydroxide solution of 10% strength. Upon completion of the condensation, the carbon tetrachloride is distilled off, 36 parts of sodium chloride are added, the precipitated dyestuff is isolated by suction filtration and is dried.

The thus-obtained dyestuff dyes cotton and fibers of regenerated cellulose from an aqueous bath in yellowish green shades of very good light fastness and good wet fastness properties.

Still yellower dyestuffs with similar properties are obtained when, while otherwise proceeding as described in the preceding paragraph, the 5.7 parts of the aforedescribed mixture are replaced by 6.4 parts of the anthraquinone derivative of the formula

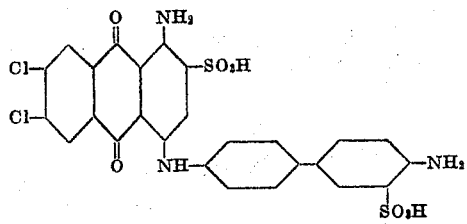

or 6.1 parts of the compound of the formula

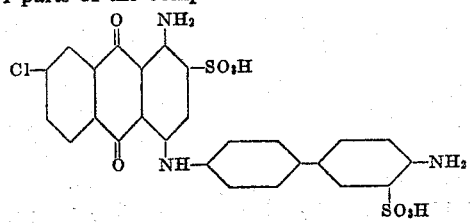

or 6.5 parts of the compound of the formula

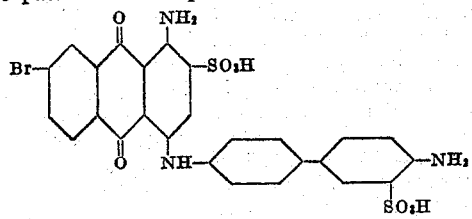

or 6.1 parts of the compound of the formula

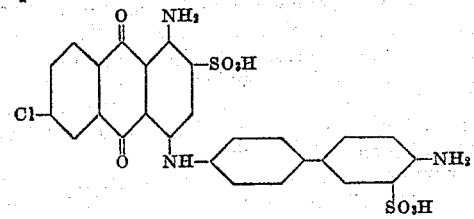

or 6.5 parts of the compound of the formula

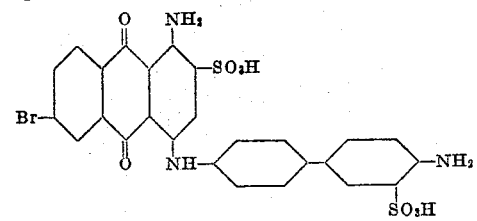

or 5.7 parts of the compound of the formula

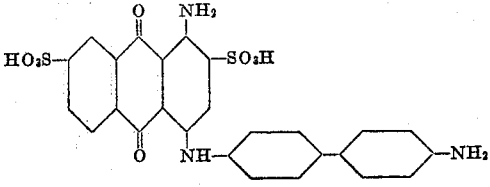

Example 15

1 part of lithium carbonate, 4.5 parts of the anthraquinone derivative of the formula

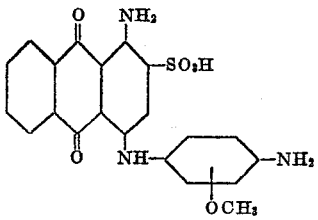

and 5.2 parts of the azo dyestuff of the formula

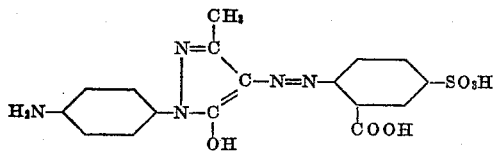

are dissolved in 500 parts of water. The solution is cooled to 10–15° and, while stirring thoroughly, 1.3 parts by volume of methyl-fumaric acid dichloride and 9 parts by volume of an aqueous sodium hydroxide solution of 10% strength are added, so that the pH of the reaction mixture constantly remains between 6 and 8.5. Upon completion of the acylation, the dyestuff is salted out by the addition of sodium chloride. After separation of the precipitated dyestuff by filtration and after drying it, a dark powder is obtained which dissolves in water with green coloration and dyes cotton and fibers of regenerated cellulose in green shades of good fastness properties.

Upon completion of the acylation, the dyestuff can be converted into its copper complex compound. For this purpose, the reaction mixture is heated to 80°, 3 parts of crystalline sodium acetate and 10 parts by volume of an aqueous copper sulfate solution of 10% strength are added, and the mixture stirred for 15 minutes. Then 35 parts of sodium chloride are added, and the precipitated dyestuff is filtered off and dried.

The obtained dark green powder dyes cotton and fibers of regenerated cellulose from an aqueous bath in yellowish green shades of good fastness properties.

A somewhat bluer dyestuff is obtained, when in the foregoing, the 4.5 parts of the specified anthraquinone derivative are replaced by 4.3 parts of the compound of the formula

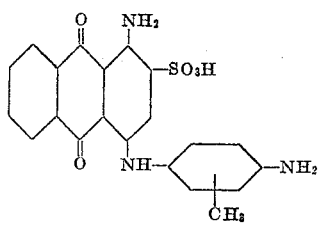

Example 16

1 part of lithium carbonate, 4.1 parts of the anthraquinone derivative of the formula

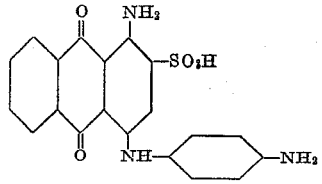

and 4.7 parts of the azo dyestuff of the formula

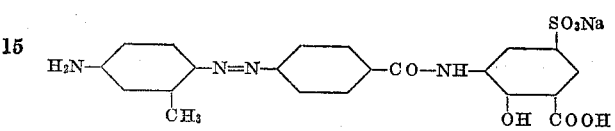

are dissolved in 600 parts of water. When dissolution is complete, the resultant solution is cooled to 8–12° and, while stirring thoroughly, 11 parts by volume of a molar solution of fumaric acid dichloride in carbon tetrachloride are added; by the simultaneous dropwise addition of 9 parts by volume of an aqueous sodium hydroxide solution of 10% strength, the pH of the reaction mass is maintained at 7–8. Upon completion of the condensation, the carbon tetrachloride is distilled off, 30 parts of sodium chloride are added, and then the precipitated dyestuff is separated by suction filtration and is dried.

The dyestuff dyes cotton and fibers of regenerated cellulose from an aqueous bath in green shades of very good light fastness and good wet fastness properties.

Aftertreatment of the dyed material with copper salts improves the wet fastness properties.

Example 17

4.1 parts of the anthraquinone derivative of the formula

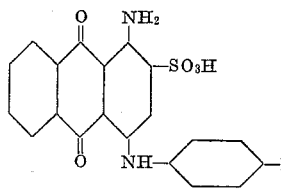

and 3.05 parts of the azo dyestuff of the formula

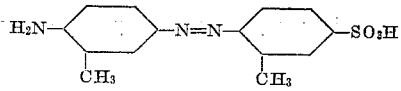

are dissolved in 600 parts of water and 7 parts by volume of aqueous sodium hydroxide solution of 10% strength. The resultant solution is cooled to 0–5° and, while stirring thoroughly, 11 parts by volume of a molar solution of fumaric acid dichloride in carbon tetrachloride are added dropwise. The reaction solution is maintained at the neutral point by the dropwise addition of an aqueous sodium hydroxide solution of 10% strength. Upon completion of the condensation, the carbon tetrachloride is distilled off, 30 parts of sodium chloride are added, the precipitated dyestuff is filtered off cold and is dried.

The dyestuff is a mixture which consists of the following components:

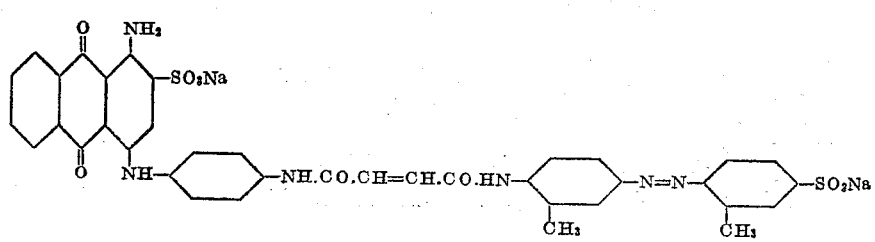

and

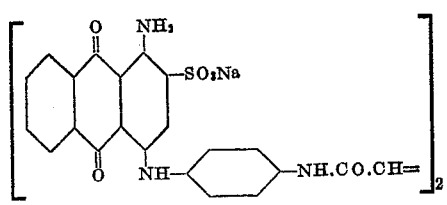

and

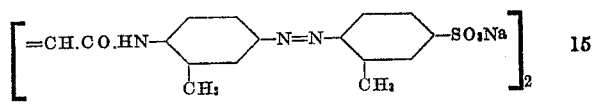

The dark green powder, which is the form taken by the dyestuff upon drying, dyes cotton and fibers of regenerated cellulose from an aqueous bath in green shades; the dyeings are of good light fastness and wet fastness.

*Example 18*

1 part of the dyestuff prepared according to Example 17 is dissolved in 200 parts of water at 100°. The solution is poured into 3400 parts of water, 150 parts of anhydrous sodium sulfate are added, and then 125 parts of pre-wetted cotton cloth are introduced at 20–30°. The bath is heated to 90–95° and is maintained at this temperature for 30 minutes. It is then allowed to boil for 15 minutes and then cooled down to 75°. The material is then rinsed and dried. The obtained green dyeing possesses good light and wet fastness properties.

*Example 19*

1 part of the unmetallized dyestuff prepared according to Example 12 is dissolved in 200 parts of water, and then 125 parts of cotton sateen are dyed therein, after the manner described in Example 18.

The dyed and rinsed material is then aftertreated for 20 minutes at 60° in a bath consisting of 2500 parts of water, 3.75 parts of crystalline copper sulfate and 3.75 parts of acetic acid. The material is thereupon rinsed and dried.

If desired, the 3.75 parts of crystalline copper sulfate may be replaced by 4 parts of crystalline potassium bichromate, in which case a chromed rather than a coppered dyeing is obtained.

The aftertreatment of the dyed cotton with the salt of copper or of chromium displaces the color of the original yellowish green dyeing somewhat toward the yellow; the fastness to washing is simultaneously improved.

*Example 20*

1 part of the dyestuff prepared according to Example 13 is dissolved in 200 parts of water at 100°. The solution is poured into 3400 parts of water, 150 parts of anhydrous sodium sulfate are added and, at 20–30°, 110 parts of pre-wetted cotton or viscose yarn are introduced. The bath is heated to 93° and the material moved around therein for 30 minutes. The bath is then allowed to cool to 70°, and the material is rinsed and dried. The thus-obtained yellowish green dyeing possesses good wet fastness and good light fastness properties.

Wherever, in the preceding examples, use has been made of fumaric acid dichloride, this may be replaced by the equivalent amount of fumaric acid dibromide.

The dyestuff is, in each of the foregoing examples, a mixture of three components of formulae X—Y—Z, X—Y—X and Z—Y—Z, wherein X, Y and Z have the initially-indicated significances, the component X—Y—Z being the essential one.

Having thus disclosed the invention, what is claimed is:

1. A green substantive dyestuff mixture obtained by condensing one molecular proportion of an anthraquinone derivative selected from the group consisting of the anthraquinone derivatives of the formulae

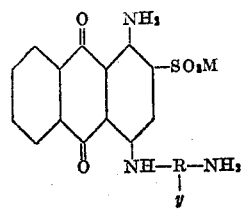

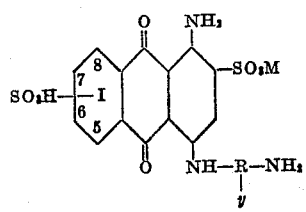

wherein the $SO_3H$ in nucleus I is in one of the positions 5, 6, 7 and 8,

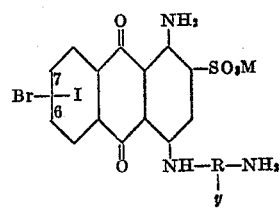

wherein the Br in nucleus I is in one of the positions 6 and 7,

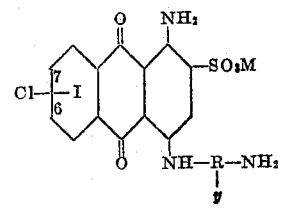

wherein the Cl in nucleus I is in one of the positions 6 and 7, and

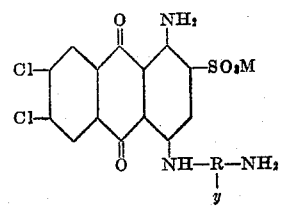

and R stands for a member selected from the group consisting of mono- and binuclear radicals of the benzene series, y is a member selected from the group consisting of hydrogen, lower alkyl, lower alkoxy and $SO_3H$, and M stands for an atom selected from the group consisting of hydrogen, lithium, sodium and potassium, with one molecular proportion of a yellow aminoazo compound containing from one to two azo groups and from zero to one atom of copper, by the action of one molecular proportion of a dicarboxylic acid halide corresponding to the formula

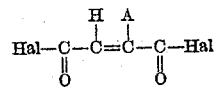

wherein Hal stands for an atom selected from the group consisting of chlorine and bromine, and A stands for a member selected from the group consisting of hydrogen, chlorine, bromine and methyl.

2. The green substantive dyestuff mixture obtained by condensing one molecular proportion of the anthraquinone derivative corresponding to the formula

[structure: anthraquinone with O, NH₂, —SO₃H, and NH—phenyl—NH₂ substituents]

and one molecular proportion of the aminoazo compound corresponding to the formula

[structure: H₂N—phenyl—N(—N=C(CH₃)—)(—C(OH)=C—N=N—phenyl—SO₃H with COOH)]

with one molecular proportion of fumaric acid dichloride.

3. The green substantive dyestuff mixture obtained by condensing one molecular proportion of the anthraquinone derivative corresponding to the formula

[structure: anthraquinone with O, NH₂, —SO₃H, and NH—phenyl—NH₂ substituents]

and one molecular proportion of the aminoazo compound corresponding to the formula

[structure: H₂N—phenyl—N(—N=C(CH₃)—)(—C—N=N—phenyl—SO₃H with O—Cu—OCO bridge)]

with one molecular proportion of fumaric acid dichloride.

4. The green substantive dyestuff mixture obtained by condensing one molecular proportion of the anthraquinone derivative corresponding to the formula

[structure: anthraquinone with O, NH₂, —SO₃H, and NH—phenyl—phenyl(SO₃H)—NH₂ substituents]

and one molecular proportion of the aminoazo compound corresponding to the formula

[structure: H₂N—phenyl—N=N—phenyl(COOH)—OH]

with one molecular proportion of fumaric acid dichloride.

5. The green substantive dyestuff mixture obtained by condensing one molecular proportion of the anthraquinone derivative corresponding to the formula

[structure: anthraquinone with O, NH₂, —SO₃H, and NH—phenyl—NH₂ substituents]

and one molecular proportion of the aminoazo compound corresponding to the formula

[structure: H₂N—phenyl(SO₃H)—CH=CH—phenyl(SO₃H)—N(—N=C(CH₃)—)(—C—N=N—phenyl—SO₃H with O—Cu—OCO bridge)]

with one molecular proportion of fumaric acid dichloride.

6. The green substantive dyestuff mixture obtained by condensing one molecular proportion of the anthraquinone derivative corresponding to the formula

[structure: anthraquinone with O, NH₂, —SO₃H, and NH—phenyl—NH₂ substituents]

and one molecular proportion of the aminoazo compound corresponding to the formula

[structure: H₂N—phenyl(CH₃)—N=N—phenyl(CH₃)—SO₃H]

with one molecular proportion of fumaric acid dichloride.

7. A process for the preparation of green substantive dyestuff mixtures which comprises condensing one molecular proportion of an anthraquinone derivative selected from the group consisting of the anthraquinone derivatives of the formula

[structure: anthraquinone with O, NH₂, —SO₃M, and NH—R—NH₂ substituents, subscript y]

[structure: anthraquinone with SO₃H in positions 5,6,7,8 of nucleus I, —SO₃M, and NH—R—NH₂, subscript y]

wherein the SO₃H in nucleus I is in one of the positions 5, 6, 7 and 8,

[structure: anthraquinone with Br in position 6 or 7 of nucleus I, —SO₃M, and NH—R—NH₂, subscript y]

wherein the Br in nucleus I is in one of the positions 6 and 7,

[structure: anthraquinone with Cl in position 6 or 7 of nucleus I, —SO₃M, and NH—R—NH₂, subscript y]

wherein the Cl in nucleus I is in one of the positions 6 and 7, and

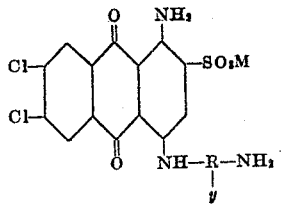

R stands for a member selected from the group consisting of mono- and binuclear radicals of the benzene series, y is a member selected from the group consisting of hydrogen, lower alkyl, lower alkoxy and SO₃H, and M stands for an atom selected from the group consisting of hydrogen, lithium, sodium and potassium, with one molecular proportion of a yellow aminoazo compound containing from one to two azo groups and from zero to one atom of copper, in aqueous solution and in the presence of an acid-binding agent, by the action of one molecular proportion of a dicarboxylic acid halide corresponding to the formula

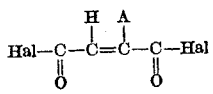

wherein Hal stands for an atom selected from the group consisting of chlorine and bromine, and A stands for a member selected from the group consisting of hydrogen, chlorine, bromine and methyl.

8. A process for the preparation of a green substantive dyestuff mixture which comprises condensing in aqueous solution and in presence of an acid-binding agent one molecular proportion of the anthraquinone derivative corresponding to the formula

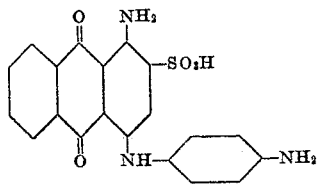

and one molecular proportion of the aminoazo compound corresponding to the formula

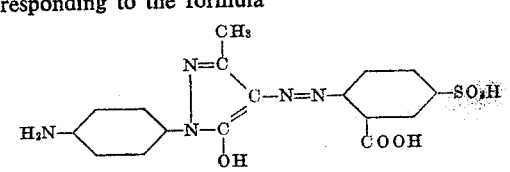

with one molecular proportion of fumaric acid dichloride.

9. A process for the preparation of a green substantive dyestuff mixture which comprises condensing in aqueous solution and in presence of an acid-binding agent one molecular proportion of the anthraquinone derivative corresponding to the formula

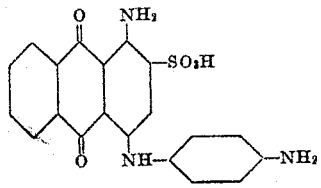

and one molecular proportion of the aminoazo compound corresponding to the formula

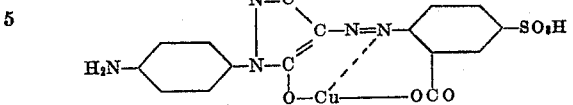

with one molecular proportion of fumaric acid dichloride.

10. A process for the preparation of a green substantive dyestuff mixture which comprises condensing in aqueous solution and in presence of an acid-binding agent one molecular proportion of the anthraquinone derivative corresponding to the formula

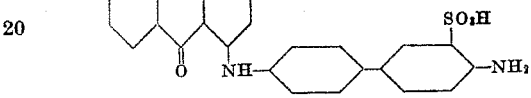

and one molecular proportion of the aminoazo compound corresponding to the formula

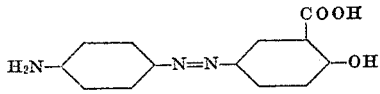

with one molecular proportion of fumaric acid dichloride.

11. A process for the preparation of a green substantive dyestuff mixture which comprises condensing in aqueous solution and in presence of an acid-binding agent one molecular proportion of the anthraquinone derivative corresponding to the formula

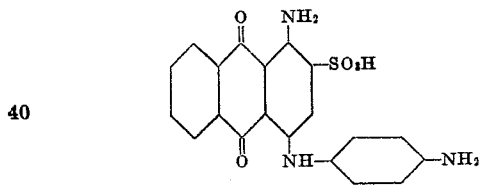

and one molecular proportion of the aminoazo compound corresponding to the formula

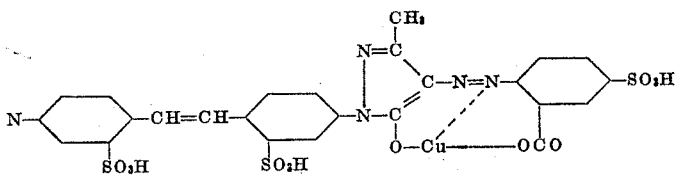

with one molecular proportion of fumaric acid dichloride.

12. A process for the preparation of a green substantive dyestuff mixture which comprises condensing in aqueous solution and in presence of an acid-binding agent one molecular proportion of the anthraquinone derivative corresponding to the formula

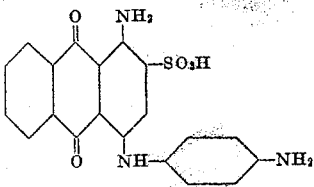

and one molecular proportion of the aminoazo compound corresponding to the formula

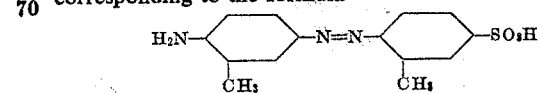

with one molecular proportion of fumaric acid dichloride.

(References on following page)

References Cited in the file of this patent

UNITED STATES PATENTS

| | | |
|---|---|---|
| 2,104,595 | Schirm | Jan. 4, 1938 |
| 2,610,103 | Widmer et al. | Sept. 9, 1952 |
| 2,623,884 | Peter et al. | Dec. 30, 1952 |
| 2,646,338 | Kappeler et al. | July 21, 1953 |

FOREIGN PATENTS

| | | |
|---|---|---|
| 819,778 | France | July 19, 1937 |